United States Patent
Song

(10) Patent No.: US 10,998,722 B2
(45) Date of Patent: May 4, 2021

(54) LOAD-SHARING POWER SYSTEM

(71) Applicant: Alpha Networks Inc., Hsinchu (TW)

(72) Inventor: Pengfei Song, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 16/861,570

(22) Filed: Apr. 29, 2020

(65) Prior Publication Data

US 2020/0389023 A1    Dec. 10, 2020

(30) Foreign Application Priority Data

Jun. 4, 2019  (TW) ................. 108119322

(51) Int. Cl.
*H02J 1/00* (2006.01)
*H02J 3/00* (2006.01)
*H02J 1/10* (2006.01)

(52) U.S. Cl.
CPC .................... *H02J 1/106* (2020.01)

(58) Field of Classification Search
CPC .................................... H02J 1/106
USPC ................................................ 307/80
See application file for complete search history.

(56) References Cited

U.S. PATENT DOCUMENTS

| | | |
|---|---|---|
| 8,415,901 B2 | 4/2013 | Recker et al. |
| 8,953,370 B2 | 2/2015 | Skinner et al. |
| 2011/0001359 A1 | 1/2011 | Moon et al. |
| 2017/0310205 A1 | 10/2017 | Coleman et al. |

FOREIGN PATENT DOCUMENTS

| | | |
|---|---|---|
| TW | 200830658 | 7/2008 |
| TW | 201628306 | 8/2016 |

OTHER PUBLICATIONS

Taiwan Intellectual Property Office, "Issue notification", dated Jan. 15, 2020.

*Primary Examiner* — Richard Tan
(74) *Attorney, Agent, or Firm* — WPAT, PC

(57) ABSTRACT

A main power load signal and a main voltage reference signal correlated to a main power signal. A sub power load signal and a sub voltage reference signal correlated to a sub power signal. A reference voltage is provided and a boost voltage is determined according to a control signal. The main voltage reference signal and the sub voltage reference signal are compared, and when the first comparison result complies with a predetermined condition, a difference between the main voltage reference signal and the sub voltage reference signal is obtained to be further compared with the reference voltage. Then the control signal is determined. The main power load signal and the sub power load signal are compared, and then one of the sub voltage reference signal and the boost voltage is selected as a power source voltage of the sub power control circuit or the load sharing control circuit to generate an adjustment signal for determining current and voltage of the sub power signal.

8 Claims, 4 Drawing Sheets

LOAD-SHARING POWER SYSTEM

FIELD OF THE INVENTION

The present invention relates to a load-sharing power system, and more particularly to a load-sharing power system adaptively controlling power load sharing of a main power supply and one or more sub power supplies.

BACKGROUND OF THE INVENTION

At present, electronic products that require high power or high reliability generally use redundant power supply technology. This technology is to design multiple power supplies to provide power to electronic products. One of the advantages is that when one power supply cannot supply power, it can be powered by redundant power supplies. In addition, when working, it can be jointly powered by multiple power supplies, i.e. load sharing, thereby reducing the load rate of a single power supply.

For an electronic device that has too limited space to install more power supplies than a built-in one but is designed to work under the redundant power supply technology, the redundant power supplies would need to be external ones. However, in the existing technology, the built-in and external power supplies are required to exhibit exactly the same functions, and the power supplies both need to exhibit load-sharing functions. Such technical conditions confine the availability of power supplies. Furthermore, since the cost of a power supply with a load-sharing function is relatively high, it will also increase the manufacturing cost of the electronic device.

SUMMARY OF THE INVENTION

Therefore, the present invention provides a load-sharing power system that may include power supplies of different specifications. Furthermore, it is not necessary for a main power supply included in the load-sharing power system to exhibit a power sharing function.

The present invention relates to a load-sharing power system, comprising: a main power supply, a sub power supply assembly, a boost circuit and a power comparing circuit.

The main power supply includes a pair of main power output terminals, through which a main power signal with a main output voltage and a main output current is outputted.

The sub power supply assembly includes at least one sub power supply circuit. The sub power supply circuit includes a sub power supply and a sub power control circuit. The sub power supply includes a pair of sub power output terminals, through which a sub power signal with a sub output current and a sub output voltage is outputted, and a feedback input terminal, through which an adjustment signal is received for determining the sub output current and the sub output voltage. The sub power control circuit is electrically coupled to a main current detection circuit, the pair of sub power output terminals and the feedback input terminal for generating a sub power load signal and a sub voltage reference signal, which are correlated to the sub power signal outputted by the sub power supply.

The boost circuit includes a reference voltage terminal, through which a reference voltage is provided, a boost output terminal, through which a boost voltage is outputted, and a control input terminal, through which a control signal is received for determining the boost voltage.

The power comparing circuit includes the main current detection circuit and a voltage servo circuit. The main current detection circuit is electrically coupled to the pair of main power output terminals for generating a main power load signal and a main voltage reference signal, which are correlated to the main power signal outputted by the main power supply, and electrically coupled to the sub power control circuit for providing the main power load signal for the sub power control circuit. The voltage servo circuit electrically coupled to the main current detection circuit, the sub power control circuit and the boost circuit, wherein the voltage servo circuit realizes the main voltage reference signal from the main current detection circuit, realizes the sub voltage reference signal from the sub power control circuit, and realizes the reference voltage from the boost circuit, wherein the main voltage reference signal and the sub voltage reference signal are compared to obtain a first comparison result, and when the first comparison result complies with a predetermined condition, a difference between the main voltage reference signal and the sub voltage reference signal is obtained to be further compared with the reference voltage to obtain a second comparison result, based on which a content of the control signal is determined.

In the load-sharing power system according to the present invention, the sub power control circuit compares the main power load signal and the sub power load signal to obtain a third comparison result, based on which one of the sub voltage reference signal and the boost voltage is selected as a power source voltage of the sub power control circuit or the load sharing control circuit to generate the adjustment signal.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
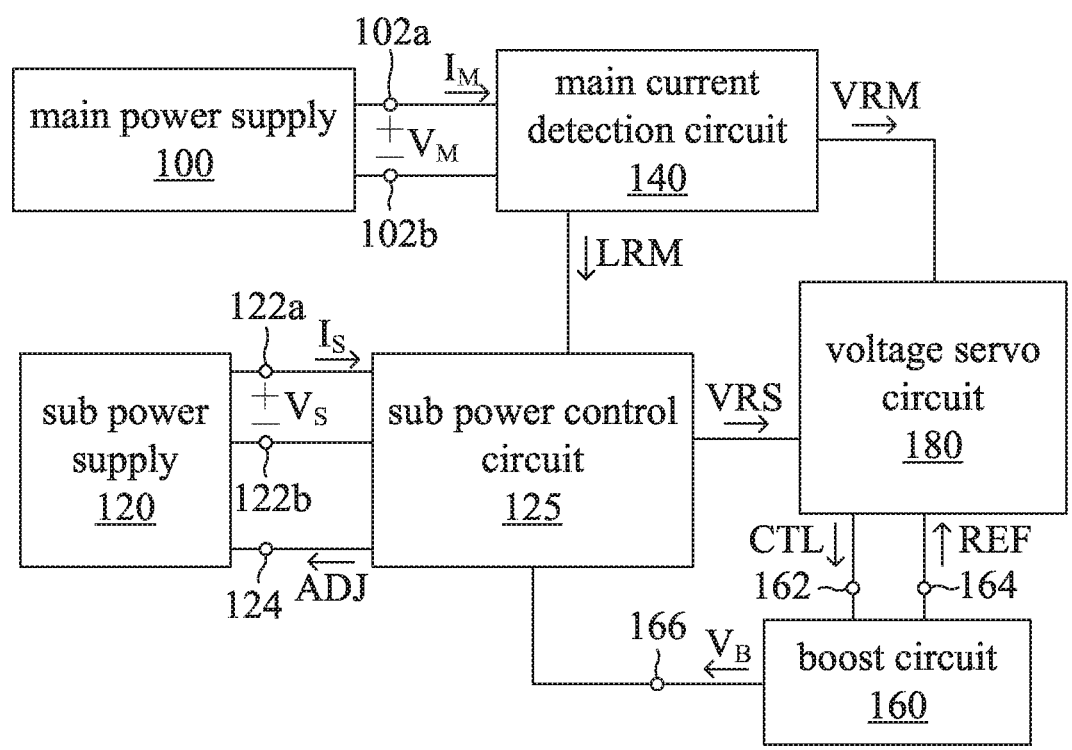
FIG. 1 is a circuit block diagram illustrating a load-sharing power system according to an embodiment of the present invention.

Please refer to FIG. 1, which is a circuit block diagram of a load-sharing power system according to an embodiment of the present invention. In this embodiment, the load-sharing power system includes a main power supply 100, a sub power supply assembly including a sub power supply 120, a sub power control circuit 125, a boost circuit 160, a main current detection circuit 140 and a voltage servo circuit 180.

The main power supply 100 is electrically coupled to the main current detection circuit 140. The main current detection circuit 140 is further electrically coupled to the sub power control circuit 125 and the voltage servo circuit 180. The voltage servo circuit 180 is further electrically coupled to the boost circuit 160 and the sub power control circuit 125. The sub power control circuit 125 is further electrically coupled to the boost circuit 160 and the sub power supply 120.

Specifically, the main power supply 100 includes a pair of main power output terminals 102a and 102b, through which a main power signal with a main output voltage $V_M$ and a main output current $I_M$ can be supplied to an external device. The main current detection circuit 140 is electrically coupled to the pair of main power output terminals 102a and 102b for detecting the main power signal provided by the main power supply 100, thereby obtaining corresponding main power load signal LRM and main voltage reference signal VRM. The main power load signal LRM mentioned herein is generally a voltage signal converted from the measured main output current $I_M$. Likewise, the main voltage reference signal VRM may also be a voltage signal converted from the measured main output current $I_M$. Alternatively, the main power load signal LRM and the main voltage reference signal VRM may also be voltage signals obtained by proportionally scaling up or down the voltage signal converted from the measured main output current $I_M$. Furthermore, the scaling ratios of the main power load signal LRM and the main voltage reference signal VRM can be different depending on practical requirements. In other words, the value of the main power load signal LRM is not necessarily equal to the main voltage reference signal VRM. Accordingly, the circuitry design of associated circuit, e.g. the sub power control circuit 125 and the voltage servo circuit 180, where the signals are applied, can be flexible.

On the other hand, the sub power supply 120 includes a pair of sub power output terminals 122a and 122b and a feedback input terminal 124. The sub power supply 120 outputs a sub power signal through the sub power output terminals 122a and 122b according to an adjustment voltage ADJ received through the feedback input terminal 124. The sub power signal is with a sub output voltage $V_s$ and a sub output current $I_s$. The sub power control circuit 125 is electrically coupled to the pair of sub power output terminals 122a and 122b to detect the sub power signal provided by the sub power supply 120, thereby realizing corresponding sub power load signal, which is not shown in FIG. 1 and can referred to LRS in FIG. 2A and FIG. 2B, and sub voltage reference signal VRS. Likewise, the sub power load signal and the sub voltage reference signal VRS are generally voltage signals converted from the measured sub output current $I_s$. Alternatively, they may be voltage signals obtained by proportionally scaling up or down the voltage signal converted from the measured sub output current $I_s$. In another embodiment, the sub voltage reference signal VRS may be a sub output voltage Vs or a voltage signal correlated to the magnitude of the sub-output voltage Vs. It is to be noted that, according to the design of the sub power supply 120 in this embodiment, the higher the voltage at the feedback input terminal 124 is, the lower the output voltage is, but this is not the only way to implement the present invention. Those skilled in the art can design the sub power supply 120 in alternative ways based on the disclosure as long as the voltage at the feedback input terminal 124 can be referred to for proper power adjustment.

Furthermore, the sub power control circuit 125 and the voltage servo circuit 180 work as a power source voltage comparing circuit. The sub power control circuit 125 compares the main power load signal LRM with the sub power load signal, and determines how the adjustment is to be performed, e.g. to adjust a voltage, based on the comparison result. In addition, the sub power control circuit 125 also outputs the sub voltage reference signal VRS to the voltage servo circuit 180. The sub voltage reference signal VRS is referred to for controlling an operation of the voltage servo circuit 180, which will be described hereinafter.

The aforementioned main voltage reference signal VRM generated by the main current detection circuit 140 is outputted to the voltage servo circuit 180. The voltage servo circuit 180 receives the main voltage reference signal VRM from the main current detection circuit 140 and receives the sub voltage reference signal VRS from the sub power control circuit 125. Then the main voltage reference signal VRM is compared with the sub voltage reference signal VRS. The operation of the voltage servo circuit 180 is controlled according to the comparison result. For example, if the main voltage reference signal VRM is greater than or equal to the sub voltage reference signal VRS, it means that the power supplied by the main power supply 100 is not lower than the power supplied by the sub power supply 120, and thus the voltage servo circuit 180 does not operate at this time. Meanwhile, with the sub voltage reference signal VRS serving as a source voltage, the sub power control circuit 125 generates an adjustment signal and outputs the adjustment signal through the feedback input terminal 124 based on the source voltage. The sub power supply 120 then adjusts the sub output voltage $V_s$ and the sub output current $I_s$ of the power supplied thereby according to the voltage of the adjustment signal.

On the contrary, if the main voltage reference signal VRM is lower than the sub voltage reference signal VRS, it means that the power supplied by the main power supply 100 is lower than the power supplied by the sub power supply 120. At this time, the voltage servo circuit 180 first realizes the difference between the main voltage reference signal VRM and the sub voltage reference signal VRS, and determines the contents, e.g. voltage and/or current, of a control signal CTL to be provided to the boost circuit 160 through a control input terminal 162 according to a difference between a reference voltage REF received from the boost circuit 160 and the difference between the main voltage reference signal VRM and the sub voltage reference signal VRS.

In addition to the control input terminal 162, the boost circuit 160 further includes a reference voltage terminal 164 and a boost output terminal 166. The boost circuit 160 provides the constant reference voltage REF to the voltage servo circuit 180 through the reference voltage terminal 164, and determines a boost voltage $V_B$ through the boost output terminal 166 based on the content of the control signal CTL received through the control input terminal 162. The boost voltage $V_B$ is then sent to the sub power control circuit 125 to serve as a source voltage for generating an adjustment signal, and the sub power control circuit 125 outputs the generated adjustment signal based on the source voltage to the feedback input terminal 124.

In other words, the sub power control circuit 125 selects the sub voltage reference signal VRS to serve as the source power for generating the adjustment signal when the main power load signal LRM is not lower than the sub power load signal, and outputs the adjustment signal ADJ through the feedback input terminal 124. On the contrary, when the main power load signal LRM is lower than the sub power load signal, sub power control circuit 125 selects the boost voltage $V_B$ to serve as the source power for generating the adjustment signal, and outputs the adjustment signal ADJ through the feedback input terminal 124. It is to be noted that since the adjustment signal is optionally transmitted through the feedback input terminal 124, it is required that the voltage of the adjustment signal lies in a range operable at the feedback input terminal 124. The voltage of the adjustment signal should be scaled up or down before it is provided at the feedback input terminal 124, and the scaled up or down adjust voltage should be lies in a range operable at the feedback input terminal 124 in order to assure of normal operation of the circuitry.

In this embodiment, the boost circuit 160 is designed to have the boost voltage $V_B$ decrease with the increase of the voltage of the control signal CTL, while the voltage servo circuit 180 is designed to have the voltage of the control circuit CTL increase with the increase of the difference between the reference voltage REF and the difference between the main voltage reference signal VRM and the sub voltage reference signal VRS. For example, if the reference voltage REF is zero, and the sub voltage reference signal VRS is greater than the main voltage reference signal VRM, the voltage servo circuit 180 will operate normally, and the voltage of the adjustment signal will be boosted by the boost voltage $V_B$ outputted from the boost circuit 160. Meanwhile, the power provided by the sub power supply 120 will be lowered. With the decreasing sub power supply, the difference between the main voltage reference signal VRM and the sub voltage reference signal VRS is decreasing, and so is the voltage of the control circuit CTL. On the other hand, the boost voltage $V_B$, in spite of still increasing, increases less significantly. As a result, on the condition of the reference voltage REF is zero, the power provided by the sub power supply 120 will be decreasing until the main voltage reference signal VRM is substantially equal to the sub voltage reference signal VRS. In this way, the voltage servo circuit 180 can have the sub power supply 120 adaptively reduce the power supplied therefrom by controlling the boost voltage 160 so as to avoid from overuse of the sub power supply 120.

In another example that the main voltage reference signal VRM is greater than or equal to the sub voltage reference signal VRS, i.e. the power from the main power supply 100 is greater than or equal to the sub power supply 120, the sub power circuit 125 compares the main power load signal LRM and the sub power load signal, and determines the contents, e.g. voltage and/or current, of the adjustment signal according to the comparison result. For example, the sub power circuit 125 in this embodiment is designed to have the voltage of the adjustment signal increase with the increase of the difference between the main power load signal LRM and the sub power load signal. When the power provided by the sub power supply 120 is lower than the power provided by the main power supply 100 so that the main voltage reference signal VRM is greater than or equal to the sub voltage reference signal VRS, the power provided by the sub power supply 120 increases with the voltage of the adjustment signal outputted by the power control circuit 125. The increase of the power provided by the sub power supply 120 results in the decrease of the difference between the main power load signal LRM and the sub power load signal, and further the decrease of the voltage of the adjustment signal. Consequently, the power provided by the sub power supply 120 is further boosted. It is finally expected to have the power provided by the sub power supply 120 substantially equal to power provided by the main power supply 100. Afterwards, the voltage servo circuit 180 is started to reversely adjust the power provided by the sub power supply 120 based on the mechanism described above to have the power decrease. Accordingly, the power provided by the main power supply 100 and the power provided by the sub power supply 120 can be adaptively adjusted.

Figure 2A:
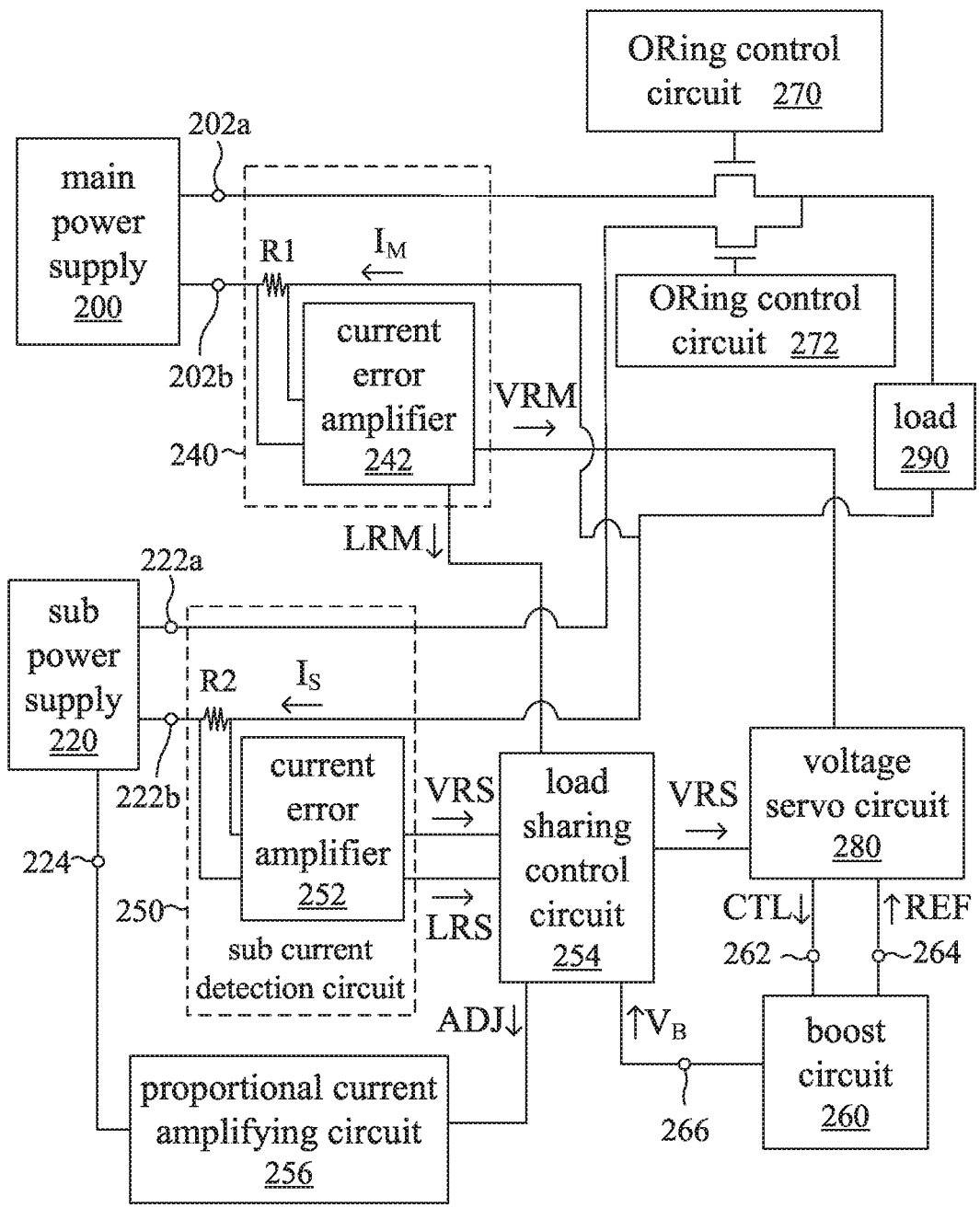
FIG. 2A is a circuit block diagram illustrating a load-sharing power system according to another embodiment of the present invention.

Please refer to FIG. 2A, which schematically illustrates a circuit block diagram illustrating a load-sharing power system according to another embodiment of the present invention. The load-sharing power system in this embodiment, like the one illustrated in FIG. 1, includes a main power supply 200, a sub power supply 220, a boost circuit 260 and a voltage servo circuit 280, which operate in similar ways to the corresponding ones illustrated in FIG. 1, and differs from the load-sharing power system illustrated in FIG. 1 in further including two additional ORing control circuits 270 and 272. The power provided by the main power supply 200 and the power provided by the sub power supply 220 are transmitted through two switches controlled by the ORing control circuit 270 and 272 to be provided for driving a load 290. The ORing control circuits 270 and 272 respectively monitor the voltage levels at the pair of power output terminals 202a and 222a in real time for controlling the switches, e.g. field effect transistors (FETs), coupled thereto to avoid current backflow.

Furthermore, the sub power control circuit in this embodiment includes a main current detection circuit 240, a sub current detection circuit 250, a load sharing control circuit 254 and a proportional current amplifying circuit 256. The main current detection circuit 240 includes a current sensing resistor R1 and a current error amplifier 242, wherein the current sensing resistor R1 is serially connected to and disposed in between the pair of power output terminals 202b and the load 290, and meanwhile parallelly connected to the current error amplifier 242. Accordingly, the main current detection circuit 240 can detect the intensity of the main output current $I_M$, and scaling up or down the main output current $I_M$ with a predetermined scaling ratio, thereby obtaining the main power load signal LRM and the main voltage reference signal VRM. Likewise, the sub current detection circuit 250 includes a current sensing resistor R2 and a current error amplifier 252, wherein the current sensing resistor R2 is serially connected to and disposed in between the power output terminal 222b and the load 290, and meanwhile parallelly connected to the current error amplifier 252. Accordingly, the sub current detection circuit 250 can detect the intensity of the sub output current $I_S$, and scaling up or down the sub output current $I_S$ with a predetermined scaling ratio, thereby obtaining the sub power load signal LRS and the sub voltage reference signal VRS. The main power load signal LRM and the sub power load signal LRS are transmitted to the load sharing control circuit 254. The load sharing control circuit 254, like the sub power control circuit 125 illustrated in FIG. 1, generates an adjustment signal ADJ accordingly. On the other hand, the main voltage reference signal VRM and the sub voltage reference signal VRS are transmitted to the voltage servo circuit 280. The voltage servo circuit 280, like the voltage servo circuit 180 illustrated in FIG. 1, determines the voltage of the control signal CTL according to the main voltage reference signal VRM, the sub voltage reference signal VRS and the reference voltage REF received through the reference voltage terminal 264. The control signal CTL is then outputted from the voltage servo circuit 280 to the boost circuit 260 through the control input terminal 262. The boost circuit 260 generates the boost voltage $V_B$ in response to the control signal CTL and transmits the boost voltage $V_B$ to the load sharing control circuit 254. The adjustment signal ADJ generated by the load sharing control circuit 254 should be conditioned first by the proportional current amplifier 256 and then passes to the feedback input terminal 224. The proportional current amplifier 256 scales up or down the adjustment signal ADJ with a predetermined scaling ratio, so the adjustment signal ADJ providing at the feedback input terminal 224 is the scaled one. The scaling operation of the proportional current amplifier 256 aims to adapt the adjustment signal ADJ for the specification of the feedback input terminal 224. Provided that the adjustment signal ADJ inherently fits the feedback input terminal 224, the proportional current amplifier 256 can be omitted from the hardware structure or it can be optionally suspended from working, depending on practical requirements.

Figure 2B:
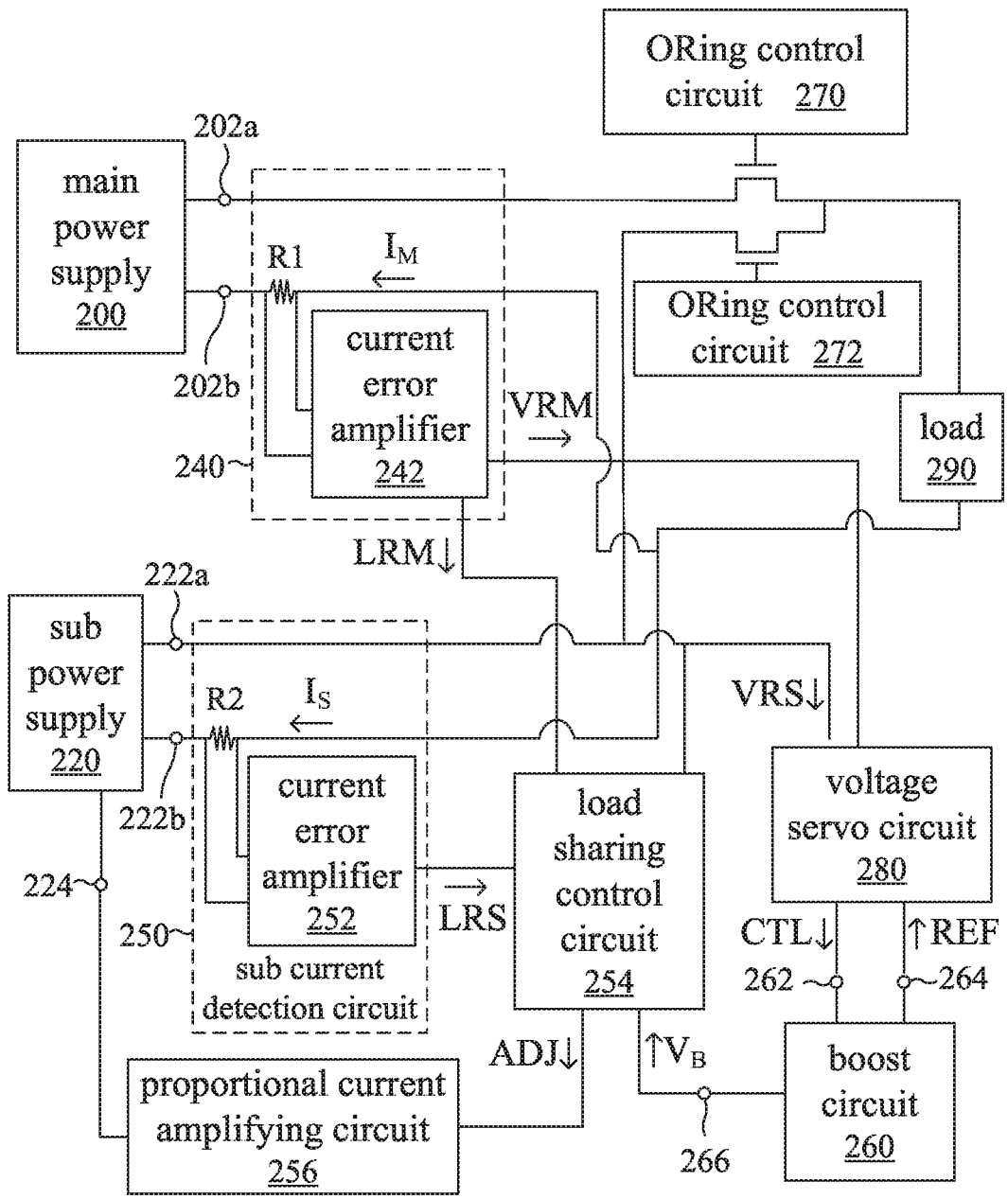
FIG. 2B is a circuit block diagram illustrating a load-sharing power system according to a further embodiment of the present invention.

In this embodiment, the sub voltage reference signal VRS, like the voltage signal $V_s$ illustrated in FIG. 1, is provided by the sub power supply 220 for the load sharing control circuit 254. The load sharing control circuit 254 further transmits the sub voltage reference signal VRS to the voltage servo circuit 280. Alternatively, as shown in FIG. 2B, which schematically illustrates a load-sharing power system according to another embodiment of the present invention, the sub voltage reference signal VRS is provided by the sub power supply 220 for the load sharing control circuit 254 through the output terminal 222a, and the sub voltage reference signal VRS is directly transmitted to both the load sharing control circuit 254 and the voltage servo circuit 280 in parallel. The operations of the circuitry are similar to those described above and not to be redundantly described herein.

Figure 3:
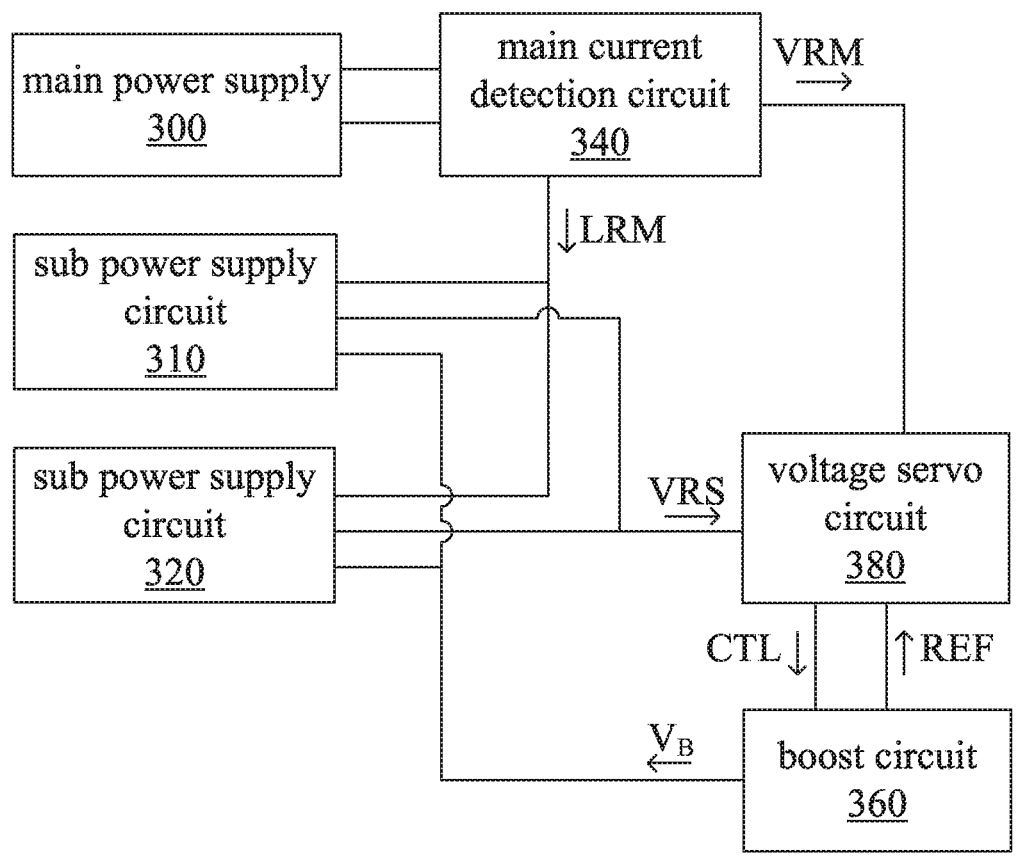
FIG. 3 is a circuit block diagram illustrating a load-sharing power system according to a still further embodiment of the present invention.

FIG. 3 schematically illustrates a load-sharing power system according to a further embodiment of the present invention. The load-sharing power system in this embodiment, like the one illustrated in FIG. 1, includes a main power supply 300, a main current detection circuit 340, a boost circuit 360 and a voltage servo circuit 380, which operate in similar ways to the corresponding ones illustrated in FIG. 1, and differs from the load-sharing power system illustrated in FIG. 1 in including two sub power supplying circuits 310 and 320, or more. Each of the sub power supplying circuit 310 may identically or differently include the sub power supply 120 and sub power control circuit 125 illustrated in FIG. 1, or alternatively, the sub power supply 220, sub current detection circuit 250, load sharing control circuit 254 and proportional current amplifying circuit 256 illustrated In FIG. 2A or 2B. In this embodiment, the sub power supplying circuits 310 and 320 are simultaneously controlled together with the operations of the main power supply 300, main current detection circuit 340, boost circuit 360 and voltage servo circuit 380 for power sharing. For those skilled in the art, the descriptions of the operational principles of the circuitry with reference to FIGS. 1, 2A and 2B can be applied herein for understanding the operations of the load-sharing power system illustrated in FIG. 3. It is also understood by those skilled in the art that more than two sub power supplying circuits can be used with a main power supply for power sharing based on the above descriptions. Furthermore, it is understood by those skilled in the art that analog circuit, digital circuit or micro-controller circuit can be alternatively used for executing the function of the corresponding circuit depending on practically requirement.

To sum up, the load-sharing power system according to the present invention manage to adjust power provided by a sub power supply according to the difference between the power from the main power supply and the power from the sub power supply. Meanwhile, the main power supply itself does not need to exhibit load sharing function, and the available type of the main power supply is thus diverse and can be cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A load-sharing power system, comprising:
 a main power supply including a pair of main power output terminals, through which a main power signal with a main output voltage and a main output current is outputted;
 a sub power supply assembly including at least one sub power supply circuit, which includes:
  a sub power supply including a pair of sub power output terminals, through which a sub power signal with a sub output current and a sub output voltage is outputted, and a feedback input terminal, through which an adjustment signal is received for determining the sub output current and the sub output voltage; and
  a sub power control circuit electrically coupled to the pair of sub power output terminals and the feedback input terminal for generating a sub power load signal and a sub voltage reference signal, which are correlated to the sub power signal outputted by the sub power supply;
 a boost circuit including a reference voltage terminal, through which a reference voltage is provided, a boost output terminal, through which a boost voltage is outputted, and a control input terminal, through which a control signal is received for determining the boost voltage; and
 a power source voltage comparing circuit, which includes:
  a main current detection circuit electrically coupled to the pair of main power output terminals for generating a main power load signal and a main voltage reference signal, which are correlated to the main power signal outputted by the main power supply, and electrically coupled to the sub power control circuit for providing the main power load signal for the sub power control circuit; and
  a voltage servo circuit electrically coupled to the main current detection circuit, the sub power control circuit and the boost circuit, wherein the voltage servo circuit realizes the main voltage reference signal from the main current detection circuit, realizes the sub voltage reference signal from the sub power control circuit, and realizes the reference voltage from the boost circuit, wherein the main voltage reference signal and the sub voltage reference signal are compared to obtain a first comparison result, and when the first comparison result complies with a predetermined condition, a difference between the main voltage reference signal and the sub voltage reference signal is obtained to be further compared with the reference voltage to obtain a second comparison result, based on which a content of the control signal is determined, wherein the sub power control circuit compares the main power load signal and the sub power load signal to obtain a third comparison result, based on which one of the sub voltage reference signal and the boost voltage is selected to generate the adjustment signal.

2. The system according to claim 1, wherein the sub power control circuit further includes:
   a sub current detection circuit electrically coupled to the pair of sub power output terminals for generating the sub power load signal and the sub voltage reference signal in response to the sub power signal; and
   a load sharing control circuit electrically coupled to the main current detection circuit, the sub current detection circuit, the boost circuit and the feedback input terminal for generating the adjustment signal according to the selected sub voltage reference or boosting voltage, which is determined by a difference of the main power load signal and the sub power load signal and outputting the adjustment signal through the feedback input terminal.

3. The system according to claim 2, wherein the sub power control circuit further includes a proportional current amplifying circuit electrically coupled to the load sharing circuit and the feedback input terminal for scaling up or down the adjustment signal and outputting the scaled adjustment signal through the feedback input terminal.

4. The system according to claim 2, wherein the sub voltage reference signal is implemented with the sub output voltage, and outputted from the sub current detection circuit to the voltage servo circuit without passing through the load sharing control circuit.

5. The system according to claim 2, wherein the sub current detection circuit includes a current sensing resistor, which is serially connected to the pair of sub power output terminals, and a current error amplifier, which is parallelly connected to the current sensing resistor.

6. The system according to claim 5, wherein the sub voltage reference signal is the sub output voltage of the current error amplifier of the sub current detection circuit.

7. The system according to claim 1, further comprising:
   a first ORing control circuit monitoring the pair of main power output terminals for determining whether to output the main power signal to load or not; and
   a second ORing control circuit monitoring the pair of sub power output terminals for determining whether to output the sub power signal to load or not.

8. The system according to claim 1, wherein the main current detection circuit includes a current sensing resistor, which is serially connected to the pair of main power output terminals, and a current error amplifier, which is parallelly connected to the current sensing resistor.

* * * * *